United States Patent
Tsuji

(10) Patent No.: US 7,753,613 B2
(45) Date of Patent: Jul. 13, 2010

(54) CONNECTOR

(75) Inventor: Takeshi Tsuji, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 10/880,780

(22) Filed: Jun. 30, 2004

(65) Prior Publication Data

US 2005/0002734 A1 Jan. 6, 2005

(30) Foreign Application Priority Data

Jul. 2, 2003 (JP) ............................. 2003-190231

(51) Int. Cl.
*H01R 13/627* (2006.01)
(52) U.S. Cl. .................. 403/326; 403/329; 439/350; 439/357
(58) Field of Classification Search ................ 403/326, 403/329, 316; 439/350–357
See application file for complete search history.

(56) References Cited

U.S. PATENT DOCUMENTS

| 5,015,199 | A | * | 5/1991 | Hirano et al. | ................ | 439/353 |
| 5,190,467 | A | * | 3/1993 | Ohta | ............................ | 439/354 |
| 5,378,168 | A | | 1/1995 | Sumida | | |
| 5,399,045 | A | | 3/1995 | Yoneda et al. | | |
| 5,830,002 | A | | 11/1998 | Ito et al. | | |
| 6,364,618 | B1 | * | 4/2002 | Moreno | ....................... | 403/326 |
| 6,609,932 | B2 | * | 8/2003 | Fukatsu et al. | .............. | 439/352 |
| 6,676,433 | B1 | * | 1/2004 | Ozaki | ........................... | 439/352 |
| 6,890,204 | B2 | * | 5/2005 | Yamawaki | ................... | 439/350 |
| 2001/0046803 | A1 | * | 11/2001 | Kodama | ...................... | 439/357 |
| 2003/0045153 | A1 | * | 3/2003 | Yamawaki | ................... | 439/352 |

* cited by examiner

*Primary Examiner*—Robert J Sandy
(74) *Attorney, Agent, or Firm*—Gerald E. Hespos; Michael J. Porco

(57) ABSTRACT

A male housing (10) has a to-be-locked part (13) formed thereon. A female housing (20) has a locking arm (30) that locks the to-be-locked part (13), thus holding both housings (10, 20) undisplaceably relative to each other in a separation direction after the housings (10, 20) fit together properly. The male housing (10) has a prevention part (14) that is locked to a front surface (37a) of a to-be-prevented portion (37) of the locking arm (30), thus preventing both housings (10, 20) from being displaced relative to each other in a fit-on direction. The prevention part (14) is disposed outward from the to-be-locked part (13) in the widthwise direction orthogonal to the fit-on and separation direction of both housings (10, 20). Thus, the male housing (10) can be molded from resin without using a slide die that closes and opens in a vertical direction or a widthwise direction.

14 Claims, 5 Drawing Sheets

CONNECTOR

BACKGROUND OF THE INVENTION

1. Field of the Invention

The present invention relates to a connector.

2. Description of the Related Art

U.S. Patent Application Pub. No. 2003/0045153 A1 discloses a connector in which female and male housings are restrained from becoming loose after they fit together. More particularly, the female housing has a to-be-locked part to be locked to the rear surface of a locking portion on a locking arm of the male housing. The female housing also has a prevention part locked to the front surface of the locking portion. Thus, the locking portion is sandwiched longitudinally between the to-be-locked part and the prevention part to prevent the housings from becoming loose longitudinally along a fit-on and separation direction.

The to-be-locked part and the prevention part of the above-described connector confront each other and align with each other in the longitudinal direction of the connector. Therefore, the female housing must be molded with a slide die that closes and opens in a vertical direction in addition to a die that closes and opens in the longitudinal direction. The die has a complicated construction and hence the connector is manufactured at a high cost.

The present invention has been completed in view of the above-described situation, and an object of the invention to simplify the construction of a die.

SUMMARY OF THE INVENTION

The invention relates to a connector including first and second housings capable of fitting together. The first housing has at least one to-be-locked part. The second housing has a locking arm that locks to the to-be-locked part to hold the housings undisplaceably relative to each other in a separation direction after the housings are fit together normally. The first housing also has at least one prevention part that is locked to the locking arm, thus preventing the housings that have been fit together normally from being displaced relative to each other in a fit-on direction. The prevention part is disposed outward from the to-be-locked part in a widthwise direction orthogonal to the fit-on direction and the separation direction of the housings.

The to-be-locked part and the prevention part both are locked to the locking arm when the housings are fit together normally. Thus, the housings are prevented from being displaced relative to each other in the fit-on and separation direction, and the housings cannot become loose.

The prevention part is shifted from the to-be-locked part in the widthwise direction orthogonal to the fit-on and separation direction of the housings. Therefore, the first housing can be molded from resin without using a slide die that closes and opens in a direction intersecting the fit-on and separation direction. Accordingly, it is possible to simplify the construction of the die for forming the first housing.

The at least one prevention part preferably comprises two prevention parts spaced at a predetermined interval in the widthwise direction so that both are capable of contacting a surface of the locking arm extended in the fit-on direction and the separation direction. The two laterally spaced prevention parts cooperate to prevent housings from becoming loose widthwise.

DETAILED DESCRIPTION OF THE PREFERRED EMBODIMENTS

Figure 1:
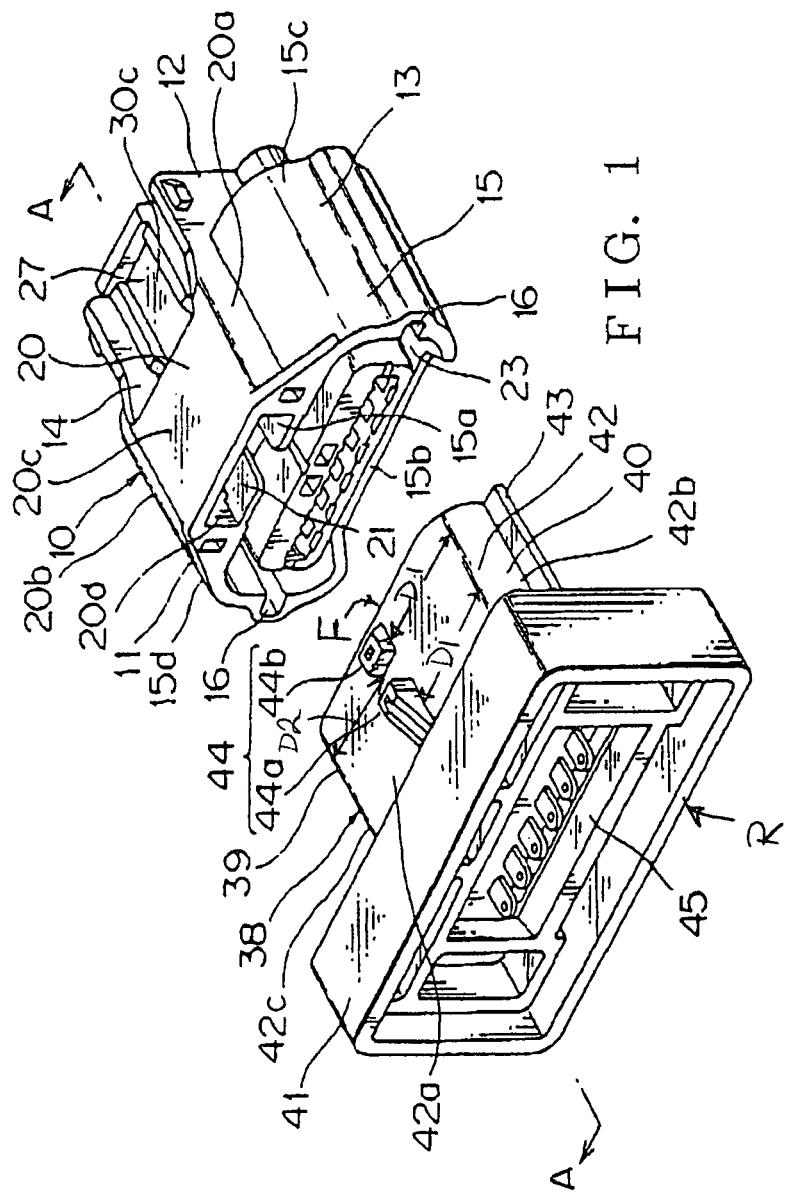
FIG. 1 is a sectional side elevation showing a state before fit-on of both housings according to an embodiment of the present invention.

A connector according to the invention has male and female housings identified respectively by the numerals 10 and 20 in FIGS. 1 to 6. The housings 10, 20 are configured to fit together. A locking arm 30 is provided on the female housing 20 and a to-be-locked part 13 on the male housing 10 can be locked to the locking arm 30. In the following description, a fit-on side of the housings 10 and 20 is referred to as the front, and reference is made to FIG. 1 concerning the vertical direction.

The male housing 10 is made of synthetic resin. As shown in FIG. 1, the male housing 10 has an approximately square pillar-shaped hood 11 that projects forward. A terminal accommodation part 21 of the female housing 20 can be fit inside the hood 11, and a tubular part 22 of the female housing 20 can be fit on the outer side of the hood 11. A tab-shaped male terminal fitting 12 projects forward from a rear part of the hood 11. A to-be-locked part 13 projects up from an upper surface of the hood 11, and can be locked to a locking arm 30 on the female housing 20. A front surface 13a of the to-be-locked part 13 is tapered up and to the rear so that the front surface 13a is capable of generating deflection of the locking arm 30 as the housings 10, 20 are being fit together. A rear surface 13b of the to-be-locked part 13 is vertically straight and substantially normal to the fitting direction for locked engagement with the locking arm 30 when the housings 10, 20 are fit properly together. The to-be-locked part 13 is locked to the locking arm 30 for holding the housings 10 and 20 undisplaceably relative to each other in a separation direction after they are fit together properly. Two upwardly projected prevention parts 14 are formed on the upper surface of the hood 11 for locked engagement against the front surface of the locking arm 30. The prevention parts 14 prevent the housings 10 and 20 from being displaced relative to each other in a fit-on direction after the housings 10, 20 have been fit together properly. More particularly, the prevention part 14 has a front locking surface 14a that is aligned vertically and substantially normal to the fit-on direction for locked abutment against the locking arm 30. A rear surface of the prevention part 14 is tapered down towards the rear. The positional relationship between the to-be-locked part 13 and the prevention part 14 is described in detail below.

The female housing 20 is made of synthetic resin. The female housing 20 has the terminal accommodation part 21 capable of accommodating female terminal fittings 25 therein. The approximately square tubular cylindrical part 22 surrounds the terminal accommodation part 21 and is connected to the terminal accommodation part 21. A forwardly open fit-in cavity 23 is formed between the terminal accommodation part 21 and the cylindrical part 22 for receiving the hood 11 of the male housing 10. Cavities 24 are provided in the terminal accommodation part 21, and the female terminal fittings 25 can be inserted respectively into the cavities 24 from the rear.

The female terminal fitting 25 has an approximately box-shaped connection part 25a at the front end thereof. A mountain-shaped elastic connection piece 25c is formed in the connection part 25a and is capable of elastically contacting the male terminal fitting 12. A barrel 25b is disposed at the rear end of the female terminal fitting 25 and is connected with an electric wire W that has a rubber plug 26 fit on a insulating cover near the end of the wire W. More particularly, the barrel 25b is crimped into connection with both the conductive core of the electric wire W and with the rubber plug 26. The rubber plug 26 closely contacts the inner peripheral surface of the cavity 24, and hence seals the inside of the cavity 24.

A lance 27 is cantilevered forward from a lower surface of the cavity 24, and is configured to be locked to a jaw 25d at the rear end of the connection part 25a, thereby securely holding the female terminal fitting 25. More particularly, the female terminal fitting 25 presses the lance 27 as the female terminal fitting 25 is inserted into the cavity 24. Thus, the lance 27 is deformed elastically into a flexing space disposed below the lance 27. The lance 27 returns resiliently towards the undeflected condition when the terminal fitting reaches a proper position in the cavity 24 and engages the jaw 25d of the terminal fitting to prevent the terminal fitting 25 from being pulled rearwardly out of the cavity 24.

A front retainer 28 is mounted on the periphery of the terminal accommodation part 21 in a direction from the front side of the terminal accommodation part 21. The front retainer 28 enters the flexing space of the lance 27 to prevent elastic deformation of the lance 27, thereby redundantly locking the terminal fitting 12.

A seal ring 29 is fit on the peripheral surface of the terminal accommodation part 21 and at the rear of the front retainer 28. The seal ring 29 is disposed between the terminal accommodation part 21 and the hood 11 with a pressure applied thereto when both housings 20 and 10 are fit together properly for sealing the gap between both housings 20 and 10.

Figure 2:
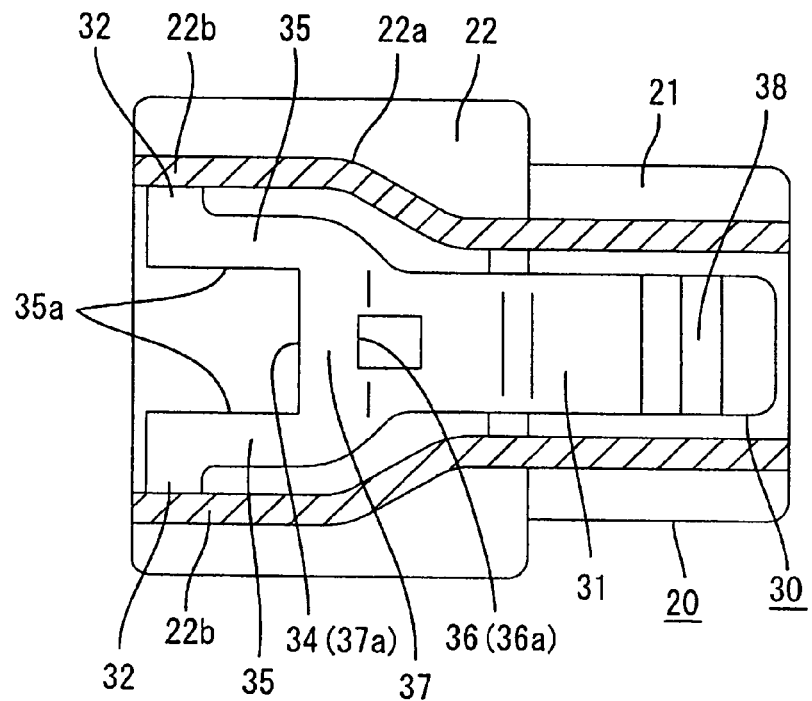
FIG. 2 is a plan view, partly in section, of a female housing.

The tubular part 22 is connected with the terminal accommodation part 21 at a position rearward from the longitudinal center of the terminal accommodation part 21. As shown in FIGS. 1 and 2, an upper portion 22a of the tubular part 22 is narrower than other portions thereof and is cut out in a predetermined configuration to form the locking arm 30. The locking arm 30 has an arm part 31 extending longitudinally, two front supports 32 that support a front-end of the arm part 31, and a rear support 33 that supports an approximately the center of the arm part 31 in the longitudinal direction of the arm part 31. Thus, the locking arm 30 is supported at three points, namely, the two front supports 32 and the rear support 33. A forward and vertically open cut-out 34 is formed at the widthwise center of a front portion of the arm part 31 to bifurcate the front of the arm part 31, and hence to define two bifurcated portions 35. Each front support 32 extends between a side edge at the front of one of the bifurcated portions 35 and a sidewall 22b of the upper portion 22a of the tubular part 22. The rear support 33 extends between a lower surface of the arm part 31 and an upper surface of the terminal accommodation part 21. Thus, the locking arm 30 is elastically deformable on each of the front supports 32 and the rear support 33. When the locking arm 30 deforms elastically, a portion of the arm part 31 between the front supporting part 32 and the rear supporting part 33 is displaced up, whereas a portion of the arm part 31 rearward from the rear supporting part 33 is displaced down. The sidewall 22b of the cylindrical part 22 is extended to the rear end of the female housing 20 to cover the locking arm 30 over the whole length thereof from both sides.

A rectangular locking opening 36 penetrates vertically through a portion of the arm part 31 between the bifurcated portions 35 and the rear support 33. The to-be-locked part 13 is capable of penetrating into the locking opening 36 when both housings 10, 20 are fit together properly. The to-be-locked part 13 and the locking opening 36 are locked together to hold the housings 10 and 20 undisplaceably relative to each other in the separation direction after they are fit together properly. A front surface 36a of the locking opening 36 is the locking surface to which the to-be-locked part 13 is locked. At parts of the inner periphery of the locking opening 36, including the front locking surface 36a, extend almost straight in the vertical direction. A portion of the arm part 31 between the bifurcated portions 35 and the locking opening 36 defines a to-be-prevented portion 37 that can fit on the to-be-locked part 13 and the prevention part 14 so that the to-be-prevented portion 37 is interposed between the to-be-locked part 13 and the prevention part 14 when the housings 10 and 20 fit together properly. A front surface 14a of the prevention part 14 contacts a front surface 37a of the to-be-prevented portion 37. Thus, both housings 10 and 20 are prevented from being displaced relatively to each other in the fit-on direction. The front surface 37a of the to-be-prevented portion 37 extends almost straight in the vertical direction. The to-be-prevented portion 37 is disposed between the front supports 32 and the rear support 33. Thus the to-be-prevented portion 37 can be displaced almost straight vertically (see FIG. 5). A stepped operation portion 38 is formed on an upper surface of a rear-end portion of the arm part 31 and can receive forces from above for unlocking the locking arm 3o.

Figure 3:
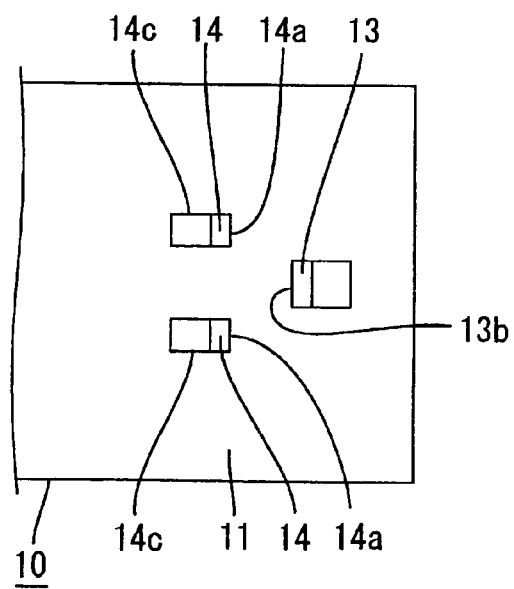
FIG. 3 is a plan view of a male housing.

As shown in FIG. 3, the to-be-locked part 13 is disposed at approximately the widthwise center of the upper surface of the male housing 10, whereas both prevention parts 14 are spaced apart in the widthwise direction. Additionally, the prevention parts 14 are shifted out from the to-be-locked part 13 in the widthwise direction, which is orthogonal to fit-on/separation direction. Accordingly, the to-be-locked part 13 and the prevention parts 14 are disposed at different positions in the widthwise direction. As a result, the male housing 10 can be molded with resin by a die that closes and opens in the longitudinal direction (fit-on/separation direction). It is unnecessary to use a slide die that closes and opens in the vertical direction or the widthwise direction orthogonal to the longitudinal direction. The rear surface 13b of the to-be-locked part 13 and the front surface 14a of the prevention part 14 are exposed to the outside and do not confront each other in the longitudinal direction.

The distance between opposite outer side surfaces 14c of the prevention parts 14 almost equals the widthwise dimension of the cut-out portion 34 of the locking arm 30, which is the distance between confronting surfaces 35a of the bifurcated portions 35. The, both prevention parts 14 enter the cut-out 34 as an operation of fitting the housings 10 and 20 together proceeds. Accordingly, the outer side surfaces 14c of the prevention parts 14 contact the side surfaces 35a of the bifurcated portions 35, thereby preventing both housings 10 and 20 from becoming loose in the widthwise direction. The side surfaces 14c of the prevention parts 14 and the side surface 35a of the bifurcated portion 35 are formed almost longitudinally straight.

Figure 4:
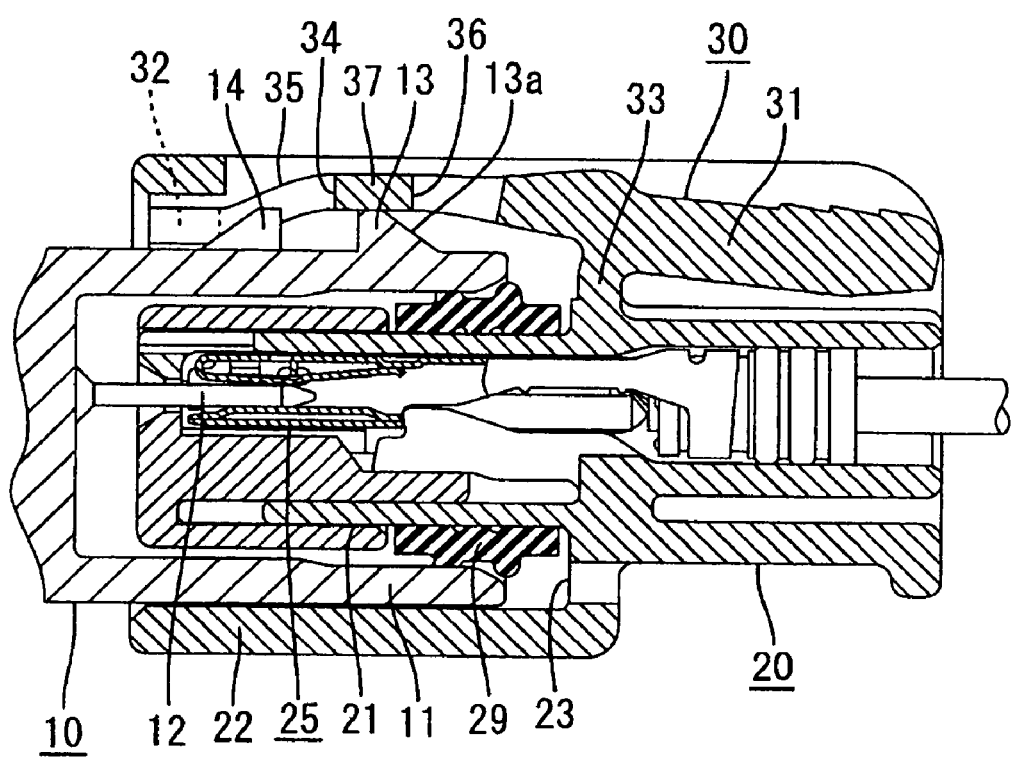
FIG. 4 is a longitudinal cross-sectional view showing the housings being fit together.

The to-be-locked part 13 and the prevention parts 14 enter the cut-out 34 between both bifurcated portions 35 of the locking arm 30 sequentially when the hood 11 of the male housing 10 is fit in the fit-in concavity 23 of the female housing 20. At this time, the side surfaces 14c of the prevention parts 14 slidably contact the side surfaces 35a of the bifurcated portions 35 to guide the fit-on operation. The to-be-prevented portion 37 of the locking arm 30 rides over the to-be-locked part 13 when the housings 10 and 20 fit on each other a predetermined length, as shown in FIG. 4. More particularly, the to-be-prevented portion 37 is guided by the front surface 13a of the to-be-locked part 13, and the locking arm 30 deforms elastically. At this time, the portion of the arm part 31 between the front supports 32 and the rear support 33 is displaced up, and the portion rearward from the rear support 33 is displaced down. The to-be-prevented portion 37 is between the front support 32 and the rear support 33 and is displaced almost straight in the vertical direction.

Figure 5:
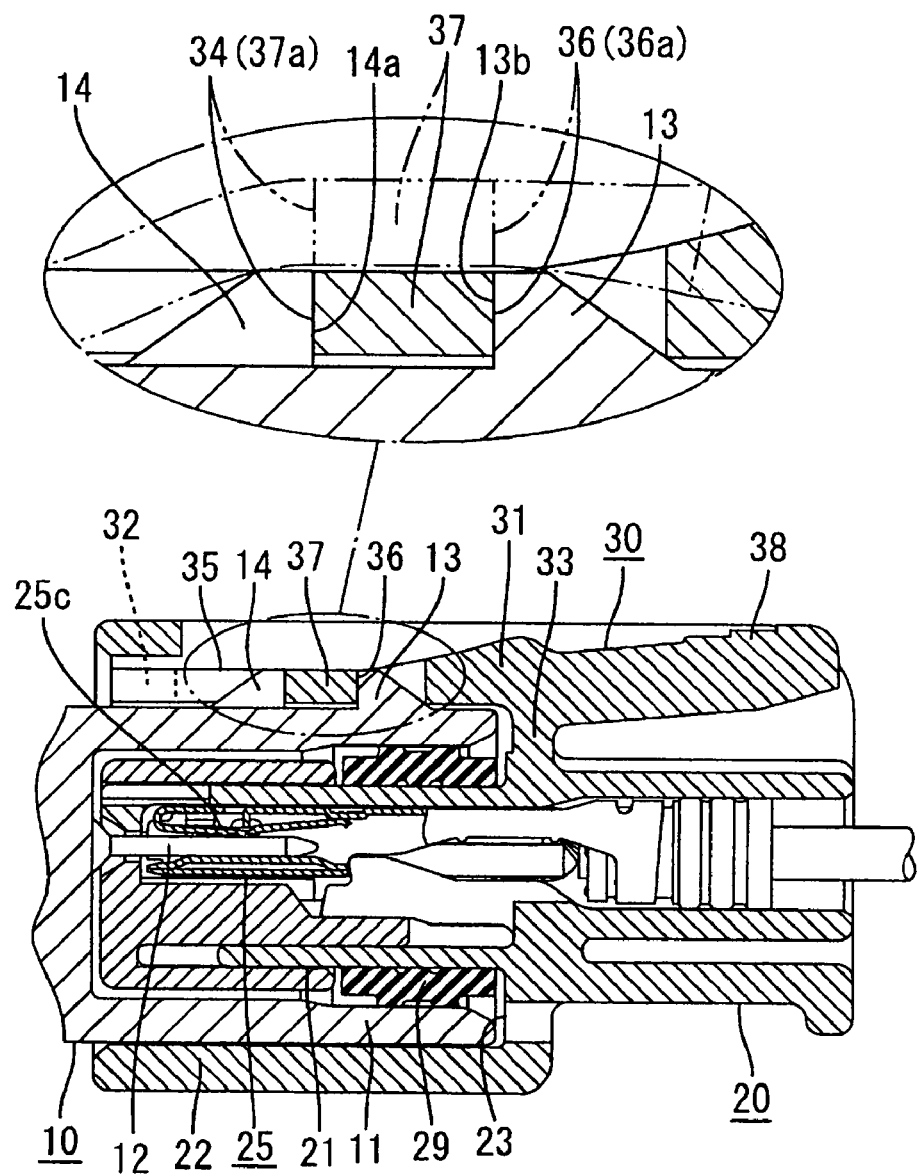
FIG. 5 is a longitudinal cross-sectional view showing the housings fit together normally.
Figure 6:
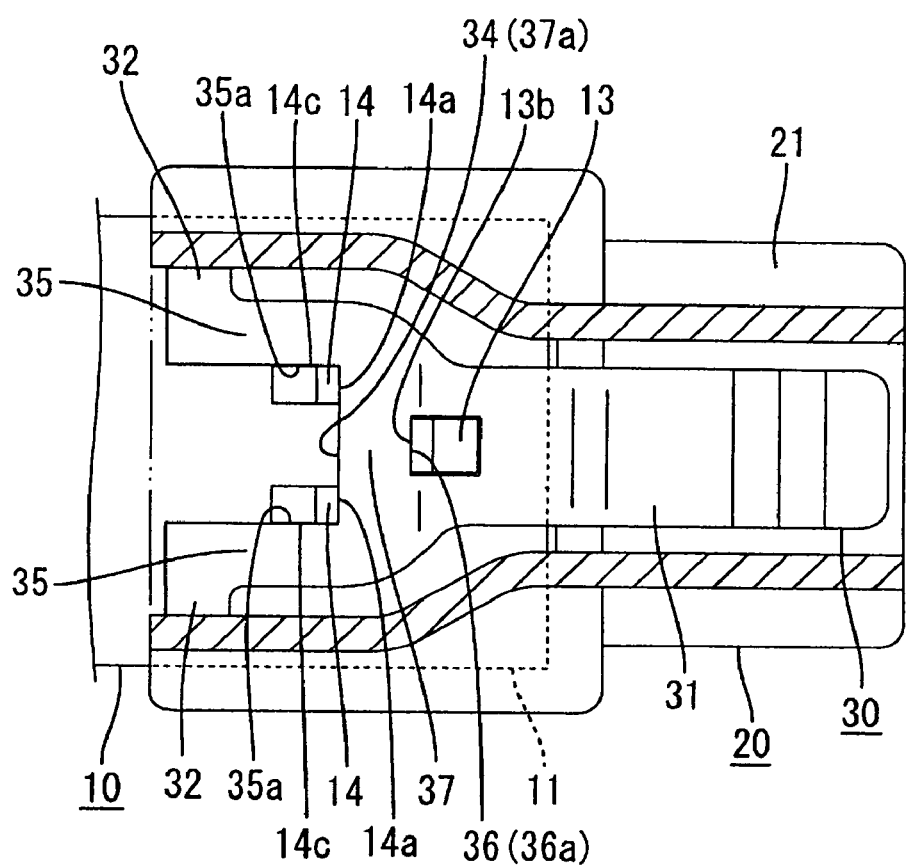
FIG. 6 is a plan view, partly in section, showing the housings that have been fit together normally.

The elastic connection piece 25c of the female terminal fitting 25 contacts the male terminal fitting 12 elastically and the to-be-prevented portion 37 of the locking arm 30 rides across the to-be-locked part 13 when the housings 10 and 20 fit together a specified amount, as shown in FIG. 5. Thus the locking arm 30 returns resiliently to its original state. The to-be-locked part 13 fits in the locking opening 36 when the locking arm 30 returns to its original state. Additionally, the to-be-prevented portion 37 fits on the prevention part 14 and the to-be-locked part 13, with the to-be-locked part 13 disposed rearward from the to-be-prevented portion 37 and with the prevention part 14 disposed forward therefrom. The displacement locus of the to-be-prevented portion 37 during the return operation of the locking arm 30 to its original state is almost straight in the vertical direction. Thus little clearance is generated between the to-be-prevented portion 37 and the prevention part 14 and between the to-be-prevented portion 37 and the to-be-locked part 13. Therefore the front surface 36a of the locking opening 36 and the front surface 14a of the prevention part 14 contact the rear surface 13b of the to-be-locked part 13 and the front surface 37a of the to-be-prevented portion 37 respectively with little gap generated therebetween. Thus, the housings 10 and 20 are not longitudinally loose after they fit together properly. Further, the outer side surfaces 14c of the prevention parts 14 contact the opposed inner side surfaces 35a of the bifurcated portions 35, as shown in FIG. 6, to prevent the locking arm 30 from becoming loose widthwise and to prevent both housings 10 and 20 from becoming loose widthwise after they fit together properly. In the proper fit-on state, the seal ring 29 closely contacts the peripheral surface of the terminal accommodation part 21 and the inner peripheral surface of the hood 11 with a pressure applied to the seal ring 29, thus sealing the gap between both housings 20 and 10.

The housings 10 and 20 may have to be separated from each other for maintenance. In this case, the operation portion 38 of the locking arm 30 is pressed down from above to deform the locking arm 30 elastically. At this time, the to-be-prevented portion 37 is displaced up and almost vertically, even though there is little clearance between the rear surface 13b of the to-be-locked part 13 and the front surface 36a of the locking opening 36. Thus, the to-be-prevented portion 37 escapes from the space between the to-be-locked part 13 and the prevention part 14. As shown with an imaginary line of FIG. 5, by elastically deforming the locking arm 30 to a height at which the to-be-prevented portion 37 escapes completely from the space between the to-be-locked part 13 and the prevention part 14, the rear surface 13b of the to-be-locked part 13 and the front surface 36a of the locking portion 36 are unlocked from each other. Thus, the housings 10 and 20 can be separated from each other by removing the female housing 20 from the male housing 10.

As described above, the prevention part 14 is disposed outward from the to-be-locked part 13 in the widthwise direction orthogonal to the fit-on and separation direction of the housings 10 and 20. Therefore, the male housing 10 can be molded from resin with a die that closes and opens in the longitudinal direction of the housings 10 and 20. It is unnecessary to use a slide die that closes and opens in the vertical direction or the widthwise direction. Consequently, it is possible to simplify the construction of the die, which contributes to a low manufacturing cost.

The two prevention parts 14 are spaced at a certain interval in the widthwise direction and hence are capable of contacting the side surfaces 35a of the bifurcated portions 35. Thus, it is possible to prevent both housings 10 and 20 from becoming loose widthwise.

The invention is not limited to the embodiment described above. For example, the following embodiments are included in the technical scope of the invention. Further, various modifications of the embodiments can be made without departing from the spirit and scope of the present invention.

The configuration and disposition of the prevention part and the to-be-locked part can be altered from the illustrated embodiment. For example, only one prevention part may be formed. Alternatively, the to-be-locked part and the prevention part may be formed as a slit open longitudinally and the locking portion and to-be-prevented portion may project in correspondence to the configuration of the to-be-locked part and the prevention part. Additionally, the prevention part need not contact the side surface of the bifurcated portion of the locking arm.

In the above-described embodiment, the locking arm is supported at three points. But the present invention is applicable to a connector having a cantilevered locking arm and a seesaw-shaped locking arm.

Unlike the above-described embodiment, the present invention includes a connector in which the locking arm is formed on the male housing, and the to-be-locked part and the prevention part are formed on the female housing.

A waterproof connector has been exemplified in the above-described embodiment. However, the invention is applicable to a non-waterproof connector.

What is claimed is:

1. A connector, comprising:
  first and second housings capable of fitting together along a fit-on direction;
  said first housing having a front end and a plurality of walls substantially rigidly arranged relative to one another and defining a forwardly open receptacle extending rearwardly into the first housing along the fit-on direction, a to-be-locked part projecting rigidly outward from a first of said walls defining the receptacle and having a rearwardly facing lock surface aligned substantially perpendicular to the fit-on direction so that the to-be-locked part and the locking surface thereof are substantially immovable with respect to the walls of the housing; and
  said second housing having a terminal accommodation part with a front end configured for insertion in the receptacle of the first housing and an opposite rear end, a support projecting out from the terminal accommodation portion and a resiliently deflectable locking arm projecting from the support and being resiliently movable towards and away from the terminal accommodation portion, the locking arm having two bifurcated portions extending from the support toward the front end of the second housing to define a forwardly open cut-out therebetween, a locking opening formed through the locking arm at a position rearward of the cut out and forward of the support, a to-be-preventing portion between the cut-out and the locking opening, the to-be-preventing portion having a forwardly facing surface aligned perpendicular to the fit-on direction and a rearwardly facing surface aligned substantially perpendicular to the fit-on direction so that the rearwardly facing surface locks to said to-be-locked part for holding said housings undisplaceably relative to each other in a separation direction after said housings fit together properly;

wherein said first housing has two prevention parts projecting rigidly from the first wall and spaced apart in a widthwise direction orthogonal to said fit-on direction and said separation direction of said housings, said prevention parts being disposed rearward of the to-be-locked part so that the prevention parts are substantially immovable with respect to the walls of the first housing, the prevention parts each having a forwardly facing locking surface aligned perpendicular to the fit-on direction and being locked to the forwardly facing surface of the to-be-prevented portion of said locking arm, thus preventing said housings which have fit together properly from being displaced relative to each other in the fit-on direction; and said prevention parts are disposed outward from said to-be-locked part in the widthwise direction and no prevention part being disposed in alignment with the to-be-locked part along the fit-on direction and the separation direction.

2. A connector, comprising:

a first housing having opposite front and rear ends spaced apart along a fit-on direction and opposite first and second sides, a wall extending rearward from the front end and between the opposite first and second sides, a receptacle extending rearwardly into the front end of the first housing and defined partly by the wall, a to-be-locked part projecting rigidly from the wall of the first housing and spaced from the first and second sides of the first housing by selected first and second distances, the to-be-locked part having a rearwardly facing locking surface aligned substantially normal to the fit-on direction, and first and second prevention parts projected rigidly from the wall of the first housing at position rearward of the to-be-locked part and being disposed so that all areas of the first prevention part are spaced from the first side a distance less than the distance between the to-be-locked part and the first side and so that all areas of the second prevention part are spaced from the second side a distance less than the distance between the to-be-locked and the second side, all areas of the wall aligned with the to-be-locked part along the fit-on direction and between the to-be-locked part and the rear end of the first housing being free of prevention parts and other projections, the first and second prevention parts respectively having a first and second forwardly facing engagement surfaces aligned normal to the fit-on direction, the to-be-locked part and the prevention parts being substantially immovable with respect to the wall and the receptacle of the first housing; and a second housing having a terminal accommodation part connected in the receptacle of the first housing, the second housing having a resiliently deflectable locking arm that is movable towards and away from the terminal accommodation portion, the locking arm having two bifurcated portions extending from the support toward the front end of the second housing to define a forwardly open cut-out therebetween, a locking opening formed through the locking arm at a position rearward of the cut out and forward of the support, a to-be-preventing portion between the cut-out and the locking opening, the to-be-preventing portion having a rear surface engaged with the locking surface of said to-be-locked part for preventing separation of said housings, the to-be-prevented portion of the locking arm further having first and second front surfaces aligned normal to the fit-on direction at positions in forwardly open cut-out and engaging the respective first and second engagement surfaces of the prevention parts for limiting movement of the first and second housings towards one another.

3. The connector of claim 2, wherein the locking arm further engages surfaces of the first and second prevention parts facing the respective first and second sides for limiting transverse movement of the first and second housings.

4. The connector of claim 2, wherein the locking arm includes a locking window disposed for engaging the to-be-locked part, the locking window having a width less than a distance between said first and second prevention parts so that the locking arm is substantially solid at locations extending from the first and second front surfaces to positions rearward of the locking window.

5. A connector, comprising:

a first housing having opposite front and rear ends and opposite first and second sides, a wall extending rearward from the front end and between the opposite first and second sides, a forwardly open receptacle in the first housing and defined partly by the wall, a to-be-locked part rigidly disposed substantially centrally between the first and second sides of the first housing, a first prevention part rigidly disposed on the wall of the first housing at a position closer to the first side of the first housing than to the second side thereof and a second prevention part rigidly disposed on the wall of the first housing at a position closer to the second side of the first housing than to the first side thereof, the first and second prevention parts having forwardly facing engaging surfaces aligned perpendicular to a front-to-rear direction and being disposed so that no portion of either prevention part is disposed between the to-be-locked part and the rear end of the first housing along a front to rear direction, the to-be-locked part and the prevention part being substantially immovable with respect to the wall and the receptacle of the first housing, the prevention parts being between the to-be-locked part and the rear end of the first housing; and a second housing having a terminal accommodation part connected in the receptacle of the first housing, the second housing having a resiliently deflectable locking arm that is movable toward and away from the terminal accommodation portion, the locking arm having a forwardly open cut-out and a locking window extending therethrough at a position rearward of the cut-out, a to-be-prevented portion between the cut-out and the locking window, the to-be-prevented portion having a rear locking surface facing into the locking window and engaged with a surface of said to-be-locked part facing the rear end of the first housing for preventing separation of said housings, the to-be-prevented portion of the locking arm further having first and second front preventing surfaces aligned perpendicular to the front to rear direction at positions facing into the forwardly open cut-out and abutting the engaging surfaces of the prevention parts for limiting movement of the first and second housings towards one another.

6. The connector of claim 5, wherein the locking arm further engages surfaces of the first and second prevention parts facing the respective first and second sides for limiting transverse movement of the first and second housings.

7. The connector of claim 5, wherein the locking arm of the second housing has a rear support rearward of the rear locking surface, the rear locking surface and the front preventing surface being resiliently deflectable relative to the rear support towards and away from the terminal accommodation part.

8. The connector of claim 7, further comprising an actuator extending rearward of the rear support, the actuator being resiliently deflectable towards the terminal accommodation part for generating resilient deflection of the rear locking surface away from the terminal accommodation part.

9. The connector of claim 8, further comprising first and second front supports supporting a front end of the locking arm relative to the terminal accommodation part.

10. The connector of claim 9, wherein the locking arm includes first and second bifurcated portions on opposite sides of the cut-out and extending from the front preventing surface to the respective first and second front supports.

11. The connector of claim 10, wherein the first and second bifurcated portions engage side surfaces of the respective first and second preventing parts for preventing transverse movement of the first and second housings relative to one another.

12. The connector of claim 5, wherein the second housing has a front end configured for mating with the front end of the first housing and a rear end opposite the front end, first and second side walls projecting from the second housing at opposite first and second sides of the locking arm, the side walls extending substantially from the front end of the second housing toward the rear end thereof, a cover wall bridging the first and second side walls of the second housing at locations adjacent the front end of the second housing, the locking surface and the preventing surfaces being rearward of the cover wall.

13. The connector of claim 12, wherein the lock arm has a front end in proximity to the front end of the second housing, the lock arm being of substantially uniform thickness in a resiliently deflectable direction at all position thereon from the front end of the locking arm to the locking window thereof.

14. The connector of claim 13, wherein the locking window has a width measured normal to a connecting direction of the first housing with the second housing and normal to the deflectable direction of the lock arm, a distance between the first and second prevention parts being greater than a maximum width of the locking window, portions of the locking arm rearward of the preventing surfaces thereof being substantially solid at least to positions aligned with the locking window.

* * * * *